United States Patent [19]

Luker

[11] Patent Number: 4,490,624

[45] Date of Patent: Dec. 25, 1984

[54] DOOR CONTROL APPARATUS

[75] Inventor: Graham J. Luker, Penshurst, Australia

[73] Assignee: The EFCO Manufacturing Company Pty. Ltd., New South Whales, Australia

[21] Appl. No.: 499,784

[22] Filed: May 31, 1983

[30] Foreign Application Priority Data

Jun. 2, 1982 [AU] Australia .............................. PF4253

[51] Int. Cl.[3] .............................................. H02J 9/06

[52] U.S. Cl. ........................................ 307/66; 307/86; 318/109; 318/442

[58] Field of Search ............................ 307/64, 66, 86; 318/106, 109, 442; 290/4 A-4 C; 49/24, 25

[56] References Cited

U.S. PATENT DOCUMENTS

| | | | |
|---|---|---|---|
| 3,790,810 | 2/1974 | Rogers et al. | 307/66 |
| 3,874,117 | 4/1975 | Boehm | 318/442 X |
| 4,029,176 | 6/1977 | Mills | 49/25 X |

*Primary Examiner*—A. D. Pellinen
*Assistant Examiner*—Derek Jennings
*Attorney, Agent, or Firm*—Leydig, Voit, Osann, Mayer and Holt, Ltd.

[57] ABSTRACT

A fail safe mechanism for power operated doors comprises an auxiliary power supply, an electric motor, a self operating clutch to connect the motor to the door's normal drive assembly and a relay/timer circuit to energize the motor in the event of a mains failure to enable the motor to drive the door open.

6 Claims, 2 Drawing Figures

DOOR CONTROL APPARATUS

FIELD OF THE INVENTION

This invention relates to the automatic control of doors and more particularly to apparatus for providing fail-safe automatic door operation.

DESCRIPTION OF THE PRIOR ART

Automatic doors are commonly found at the entrance to a public building or shop. The doors normally close a passageway but, unless locked, open in response to approaching pedestrian or vehicular traffic. After passage of the traffic and in the absence of a requirement to remain open, the doors automatically close.

The invention will herein be described with reference to automatic sliding doors. Typically such doors are driven from the closed to an open position by an electric motor via a drive assembly comprising a sprocket mounted to the motor shaft and a flexible drive chain connected to the door. Alternatively the drive assembly may comprise a pully and belt. The approach of traffic is sensed by a foot pad or radar type movement sensor which issues a control signal to actuate the motor to open the door and after traffic is no longer sensed, the electric motor drives the doors to a closed position. Such doors and their operation are well known to those skilled in the art and require no further explanation.

It is increasingly desired, or required by legislation, that automatic doors be fail-safe by which is meant that in the event of a power supply failure the door, unless previously locked, automatically opens and allows passage.

Previously it has been proposed to achieve fail-safe operation by means of a spring tensioned and held by an electromagnet. In the event of a power failure the electromagnet releases the tensioned spring and a spur attached to the spring engages and drives open the door as described in Australian patent specification 467,591. That method suffers from a number of disadvantages. For example, upon restoration of power the doors must manually be forced to a closed position against the spring before the doors will operate correctly, as the operating motor is not strong enough to tension the spring completely and may be overloaded. If a larger capacity motor were to be employed to overcome the fail-safe spring it would require more space than is desirable and would be wasteful in relation to requirements for normal operating conditions. Australian patent specification 75071/81 proposes to overcome some of those disadvantages by employing an electrically operated winching device for the purpose of retensioning the spring on resumption of power after interruption. Both methods suffer from the disadvantage that if a power failure occurs when the door is in position other than closed, for example half open, then release of the spring may cause damage or jerky operation. The winch mechanism proposed tends to be excessively bulky and/or expensive.

BRIEF SUMMARY OF THE INVENTION

An object of the present invention is to provide a fail-safe door operating mechanism which in preferred embodiments is less expensive to manufacture and/or more efficient in operation than previously available means.

According to one aspect the invention consists in door operating means of the kind comprising an electric motor connectable to a mains power supply and a drive assembly operable by that motor to open and to close a door to be operated, characterised in that said operating means further comprise:

a second electric motor, an automatic clutch which when engaged connects the second electric motor to enable it to operate the drive assembly to open the door, a second power supply, and means responsive to interruption of the first power supply to energise the second electric motor from the second power supply and to engage the clutch.

For preference the clutch is a self-acting, one-way type which automatically engages upon the second motor being driven in a direction to open the door and the clutch automatically disengages when the second motor is driven in the opposite direction. For preference interruption of the first power supply causes a relay or other device to "drop-out" or "latch" and thus energise the second electric motor from a second supply comprising a battery which is maintained in a fully charged condition by trickle charge from the first power supply. Desirably the battery charger is provided with an alarm system which signals an undercharged or faulty battery condition. Such alternative emergency power supplies are well known per se and need no detailed description.

By way of example only an embodiment of the invention will now be further described with reference to the accompanying drawings which illustrate an electric motor and automatic clutch assembly suitable for use in the invention.

DETAILED DESCRIPTION

Figure 1:
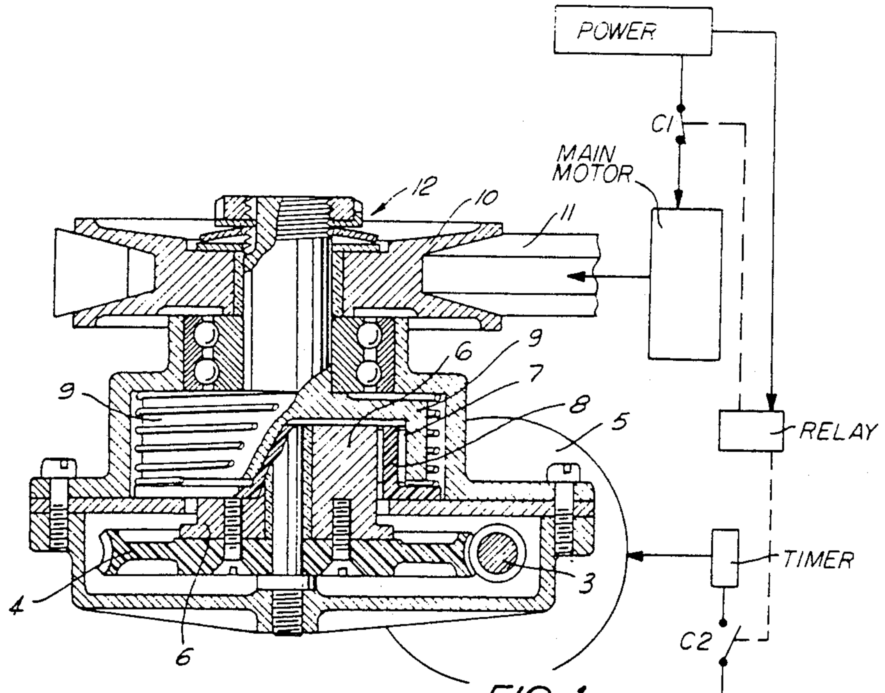
FIG. 1 is a partly sectioned view of a motor and drive assembly being a component of a door operating means according to the invention.
Figure 2:
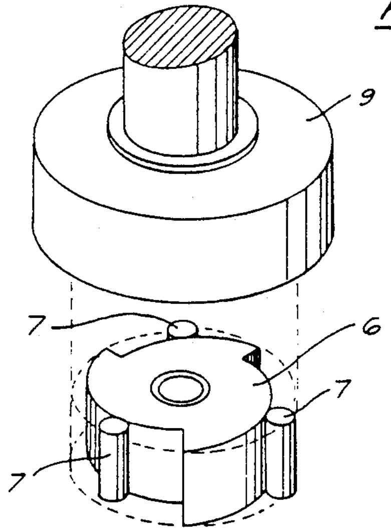
FIG. 2 is an exploded diagrammatic perspective view of clutch components of FIG. 1.

A conventional sliding door is provided with a first electric motor which is the main drive motor. The motor has a drive assembly comprising a belt and pulley by means of which the door may be driven from a normally closed to an open position and from an open position to the closed position. The main drive motor is powered from a mains electric supply by a controller which on receipt of an open signal from a sensor responsive to traffic approach energises the motor to open the door and after an interval during which no traffic is sensed operates the drive motor to close the door. The motor and drive assembly are usually housed in a channel shaped extrusion above the door.

In accordance with the invention the drive means incorporate a second electric motor and clutch, such as is illustrated by the drawings wherein a second electric motor 5, for example a twelve volt motor, which via a drive train, comprising a worm 3 and wheel 4, and a clutch assembly comprising a cam 6, rollers 7, cage 8 and drive drum 9 may drive a pulley 10 which engages the belt 11 of a conventional drive assembly (not illustrated).

During normal operation of the door, pulley 10 is driven in rotation during door operation by the drive assembly and is disengaged from electric motor 5 which is not energised. The clutch assembly is such that if second electric motor 5 is driven in the direction to cause belt 11 to open the door, then cam 6 engages the locking rollers 7 and drive drum 9 is driven in rotation. If the second electric motor 5 is de-energised and drum 9 driven in the opposite direction by the belt 11, rollers 7 disengage from drive drum 9 which is then freely rotatable. The automatic clutch also has a stationary roller support cage 8 and damping spring 1. For preference pulley 10 is provided with a safety override slippable clutch 12.

In the event of a failure in power supply to the main motor, a relay R drops out. The relay contacts C1, C2 disconnect the main and connect the second motor 5 to a battery supply B. The relay R serves both to initiate response to power interruption and to prevent simultaneous operation of both motors.

For preference the battery supply B to the second motor 5 is provided with a trickle charger TC which maintains the battery in a fully charged condition from the main supply during periods of normal uninterrupted power supply, and is provided with an audible or visual alarm system to warn in the event of an insufficient power storage or battery failure. Also during periods of main power supply a capacitor may be maintained in a charged condition and is connected to discharge across the second motor circuit in the event of a main supply interruption thus supplementing the current drawn from the battery B as starting current. Power from the battery B is supplied to the second motor 5 via a timer T so that when the second motor 5 is energised it drives the door towards an open position for a preselected time period. At expiration of the time period power to the second motor 5 is disconnected and, for preference, a second relay (not shown) reverses the motor 5 for a short period sufficient to positively disengage the clutch. The reverse may be energised either by battery or capacitor discharge. The door is thus left in an open position and with the second motor disengaged from the main motor and drive assembly.

Upon resumption of normal electricity supply the first relay re-energises the main motor and the normal control system will sense that the doors are in an open position and will cause them to close by normal operation of the system assuming the absence of traffic.

The invention thus provides for fail-safe operation of the doors and does not require manual intervention to open the doors in the event of power supply failure nor to reset the doors after resumption of main power after interruption. Furthermore in preferred embodiments these advantages are obtained at lower cost and with fewer parts than in methods previously proposed. Furthermore the fail-safe components are not under load except when required and occupy less space than in prior art methods. It will be understood that the use of a timer to control the duration of operation of the second motor has the advantage that standard means may readily be adjusted for different doorway dimensions. However limit switches or the like could also be employed to disconnect the second motor. Other automatic clutch mechanisms for example an electrically operated clutch could be employed between the second motor and the drive assembly if desired but the means described and illustrated herein reduce the power requirement. While the apparatus has been herein described with reference primarily to sliding doors, those skilled in the art will appreciate that the invention disclosed herein may be applied to swing opening doors, roller curtain doors and the like by a substantially equivalent mechanical and electric means.

I claim:

1. Door operating means of the kind comprising an electric motor connectable to a mains power supply and a drive assembly operable by that motor to open and close a door characterised in that said operating means further comprise a second electric motor, an automatic clutch which when engaged, connects the second electric motor to enable it to operate the drive assembly to open the door, a second power supply, and means responsive to interruption of the mains power supply to energise the second electric motor from the second power supply and to engage the clutch.

2. Door operating means according to claim 1, wherein said clutch is a self-acting, one way clutch which automatically engages whenever the second motor is driven in a direction to open the door and automatically disengages when the second motor is driven in the opposite direction.

3. Door operating means according to claim 2, in which the means to energise the second electric motor include timer operated switches to de-energise the second electric motor at a predetermined time after each energisation thereof and then briefly to reverse the second motor.

4. Door operating means according to claim 1, wherein said second power supply comprises a battery and a battery charger energised by the mains power supply.

5. Door operating means according to claim 2 wherein said second power supply comprises a battery and a battery charger energised by the mains power supply.

6. Door operating means according to claim 3 wherein said second power supply comprises a battery and a battery charger energised by the mains power supply.

* * * * *